United States Patent
Kim et al.

(10) Patent No.: US 12,023,967 B2
(45) Date of Patent: Jul. 2, 2024

(54) NON-PNEUMATIC TIRE INCLUDING FIBER PLATED USING METAL SALT

(71) Applicant: HANKOOK TIRE & TECHNOLOGY CO., LTD, Seongnam-si (KR)

(72) Inventors: Sung Tae Kim, Daejeon (KR); Seok Ju Choi, Daejeon (KR); Ji Wan Lee, Daejeon (KR); Jeong Heon Kim, Daejeon (KR)

(73) Assignee: HANKOOK TIRE & TECHNOLOGY CO., LTD, Seongnam-si (KR)

( * ) Notice: Subject to any disclaimer, the term of this patent is extended or adjusted under 35 U.S.C. 154(b) by 953 days.

(21) Appl. No.: 17/030,041

(22) Filed: Sep. 23, 2020

(65) Prior Publication Data
US 2021/0086568 A1   Mar. 25, 2021

(30) Foreign Application Priority Data
Sep. 24, 2019   (KR) .................. 10-2019-0117393

(51) Int. Cl.
*B60C 19/08*   (2006.01)
*B60C 7/18*   (2006.01)
(Continued)

(52) U.S. Cl.
CPC ............... *B60C 19/08* (2013.01); *B60C 7/18* (2013.01); *B60R 16/06* (2013.01);
(Continued)

(58) Field of Classification Search
CPC .................................................. Y10S 152/02
See application file for complete search history.

(56) References Cited

U.S. PATENT DOCUMENTS 7,284,582 B2    10/2007  Baldwin, Jr. et al.
2015/0328941 A1*  11/2015  Hirosue ............... B60C 19/084
                                                    152/539
(Continued)

FOREIGN PATENT DOCUMENTS

DE    102010037328 A1 *  3/2012  ............. B29D 30/38
KR      20130049544 A  *  5/2013
(Continued)

OTHER PUBLICATIONS

English machine translation of DE-102010037328-A1 (Year: 2012).*
English machine translation of KR-20130049544-A (Year: 2013).*

*Primary Examiner* — Robert C Dye
(74) *Attorney, Agent, or Firm* — Bridgeway IP Law Group, PLLC; Jihun Kim

(57) ABSTRACT

A non-pneumatic tire includes a rim part in which an insertion groove is formed and being connected with an axle; a tread part formed in a shape of surrounding an outer side of the tire in a circumferential direction thereof and being in contact with the ground; a spoke part formed between the rim part and the tread part and provided with upper arch bodies and lower arch bodies of an arch shape to absorb impacts transmitted from the ground to the tread part; a structural reinforcement part inserted into the inside of the tread part to perform load support and stress distribution of the spoke part; a conductive structure part formed between an outer surface of the rim part and an inner surface of the tread part, and having fiber plated using a metal salt.

11 Claims, 5 Drawing Sheets

(51) Int. Cl.
*B60R 16/06* (2006.01)
*B60C 7/14* (2006.01)
*C25D 5/56* (2006.01)

(52) U.S. Cl.
CPC ......... *B60B 2900/921* (2013.01); *B60C 7/146* (2021.08); *C25D 5/56* (2013.01); *Y10S 152/02* (2013.01)

(56) References Cited

U.S. PATENT DOCUMENTS

| 2018/0333984 | A1* | 11/2018 | Wilson | B60B 9/04 |
| 2019/0193465 | A1* | 6/2019 | Lee | C08L 7/00 |
| 2020/0331307 | A1* | 10/2020 | Orlowski | B60C 19/082 |

FOREIGN PATENT DOCUMENTS

| KR | 10-2017-0177686 A | 12/2017 | | |
| WO | 2017/086993 A1 | 5/2017 | | |
| WO | WO-2019123363 A1 * | 6/2019 | ........... | B60C 19/082 |

\* cited by examiner

| ITEM (Index) 175/60R14 | COMPARATIVE EXAMPLE 1 | EXAMPLE 1 | EXAMPLE 2 | EXAMPLE 3 |
|---|---|---|---|---|
| CONDUCTIVE STRUCTURE PART | NO | YES | YES | YES |
| CONDUCTIVE STRUCTURE PART DIAMETER | - | 3mm | 3mm | 3mm |
| ADHESION PART DIAMETER | - | 10mm | 10mm | 10mm |
| CONFIGURATION OF CONDUCTIVE FIBER BODY | - | FIBERS OF 20'S OBTAINED BY BLENDING COPPER SULFATE-LATED PU FIBERS AND COTTON IN A RATIO OF 2:8 | FIBERS OF 20'S OBTAINED BY BLENDING COPPER SULFATE-LATED PU FIBERS AND COTTON IN A RATIO OF 4:6 | FIBERS OF 30'S OBTAINED BY BLENDING SILVER-PLATED PU FIBERS AND COTTON IN A RATIO OF 6:4 |
| SPOKE PART MATERIAL | PU (POLYURETHANE) | PU (POLYURETHANE) | PU (POLYURETHANE) | PU (POLYURETHANE) |
| TREAD PART MATERIAL | CURRENTLY USED RUBBER COMPOUND (CONDUCTIVE) | CURRENTLY USED RUBBER COMPOUND (CONDUCTIVE) | CURRENTLY USED RUBBER COMPOUND (CONDUCTIVE) | CURRENTLY USED RUBBER COMPOUND (CONDUCTIVE) |
| HIGH SPEED DURABILITY (PS01) | 100min (OK) | 100min (OK) | 100min (OK) | 100min (OK) |
| ELECTRICAL CHARACTERISTIC (MEASURED ON TIRE, 1KV) | 1000MΩ | 200MΩ | 80MΩ | 20MΩ |

FIG. 5

NON-PNEUMATIC TIRE INCLUDING FIBER PLATED USING METAL SALT

BACKGROUND OF THE INVENTION

Field of the Invention

The present disclosure relates to a non-pneumatic tire, and more particularly, to a non-pneumatic tire including fiber plated using a metal salt.

Description of the Related Art

Tires generally used in contemporary times may be classified into radial tires, bias tires, and solid tires according to their structure, and among them, the radial tires, that is, pneumatic tires, are widely used in motor vehicles excluding ones for a special purpose. However, the structure of such pneumatic tire is complex, and a comparatively large number of manufacturing processes, typically eight steps, are required. As a result of an increase in the number of manufacturing processes, a discharge amount of harmful substances is also increased. Furthermore, because the pneumatic pressure of the tire, which positively influences the performance and safety of the pneumatic tire, must be frequently checked, thus inconvenience of a user in terms of maintenance occurs. Moreover, there is the possibility of the tire being damaged by an external substance that may pierce the tire or apply an impact to it while the vehicle is moving.

Meanwhile, unlike the pneumatic tire, the non-pneumatic tire makes it possible to simplify the material and the manufacturing process, whereby the production cost can be markedly reduced. In addition, the non-pneumatic tire is one that is formed both with a structure and by processes of a new concept, which can dramatically reduce energy consumption and the amount of harmful substances discharged. Thus, the non-pneumatic tire is advantageous in that it is free from problems which may be caused by insufficient pneumatic. Furthermore, the non-pneumatic tire can prevent a standing wave phenomenon, which occurs in the pneumatic tire, and can markedly improve a characteristic of resistance to rolling.

However, in the conventional non-pneumatic tire, the spoke part is made of polyurethane, which may be disadvantageous in discharging static electricity. Accordingly, there may occur a problem that static electricity accumulated during the driving or stopping of a motor vehicle causes a static shock when a door handle of the motor vehicle is touched.

In U.S. Pat. No. 7,284,582, a pneumatic tire including one or more conductive cords is mentioned and a method of discharging static electricity generated from a motor vehicle to the ground is introduced. However, the cords are vulnerable to the stress caused by the load acting on the tire, and it is difficult to replace damaged cords.

In Korean Patent Application Publication No. 10-2017-017109 and Korean Patent Application No. 10-20170177686, there is proposed a method of discharging static electricity generated in the bead part to the tread part by disposing, on semi-finished sheets of carcasses of a pneumatic tire, conductive fibers plated using a metal salt or blended yarns of conductive fibers plated using a metal salt and general fibers. However, the cords are vulnerable to the stress caused by the load acting on the tire, and it is difficult to replace damaged cords.

In International Publication No. WO 2017/086993, there is proposed a method of discharging static electricity generated in a motor vehicle to the ground by disposing an electrostatic discharge element, formed of a polymer having an average resistance of $4*10^5 \Omega$ and conductive carbon filament, in the inside or the outside of the spoke part of a non-pneumatic tire close to the central axis from the outer surface of the rim part to the inner surface of the tread part. However, the cords are vulnerable to the stress caused by the load acting on the tire, and it is difficult to replace damaged cords.

CITATION LIST

Patent Literature

Patent Document 1: U.S. Pat. No. 7,284,582
Patent Document 2: Korean Patent No. 10-2017-017109
Patent Document 3: Korean Patent Application No. 10-2017-0177686
Patent Document 4: International Publication No. WO 2017/086993

SUMMARY OF THE INVENTION

Accordingly, an objective of the present disclosure for addressing the above drawbacks is to reduce the static shock when touching the door handle of a motor vehicle by effectively discharging static electricity accumulated during driving and stopping, by inserting a conductive structure part formed of a fiber plated using a metal salt.

In addition, another objective of the present disclosure is to minimize the compressive tension stress of the conductive structure part generated during driving.

Technical drawbacks, which the present disclosure is to address, are not limited to the aforementioned ones, and other technical drawbacks that are not mentioned may be clearly appreciated from the following detailed description by a person having ordinary skill in the art to which the present disclosure belongs.

In order to achieve aforementioned objectives, the present disclosure is intended to provide a non-pneumatic tire capable of discharging static electricity generated at an axle to the ground, including: a rim part in which an insertion part is formed and being connected with an axle; a tread part formed in a shape of surrounding an outer side of the tire in a circumferential direction thereof and being in contact with the ground; a spoke part formed between the rim part and the tread part and provided with upper arch bodies and lower arch bodies of an arch shape to absorb impacts transmitted from the ground to the tread part; a structural reinforcement part inserted into the inside of the tread part to perform load support and stress distribution of the spoke part; a conductive structure part formed between an outer surface of the rim part and an inner surface of the tread part.

In an embodiment of the present disclosure, the spoke part may be formed of any one material selected from elastomer and rubber.

In an embodiment of the present disclosure, the rim part may have an insertion part to which the conductive structure part is coupled.

In an embodiment of the present disclosure, the conductive structure part may include a conductive fiber body discharging static electricity from the axle to the ground, and a covering body coated on the conductive fiber body.

In an embodiment of the present disclosure, the conductive fiber body may be formed by electroplating one material selected from synthetic fibers and cellulose-based fibers using a metal salt.

In an embodiment of the present disclosure, the conductive fiber body may be blended with cotton to increase the bonding force thereof with the covering body.

In an embodiment of the present disclosure, the conductive structure part may be formed so as to be coupled to the lower arch body and the upper arch body.

In an embodiment of the present disclosure, the conductive structure part may be formed in a zigzag shape to minimize stress thereof when the spoke part is deformed.

BRIEF DESCRIPTION OF THE DRAWINGS

FIG. 5 shows experimental data representing high-speed durability and discharge performance depending on the configuration of the conductive structure part and whether the conductive structure part is applied in a non-pneumatic tire according to an embodiment of the present disclosure.

DETAILED DESCRIPTION OF THE PREFERRED EMBODIMENTS

Figure 1:
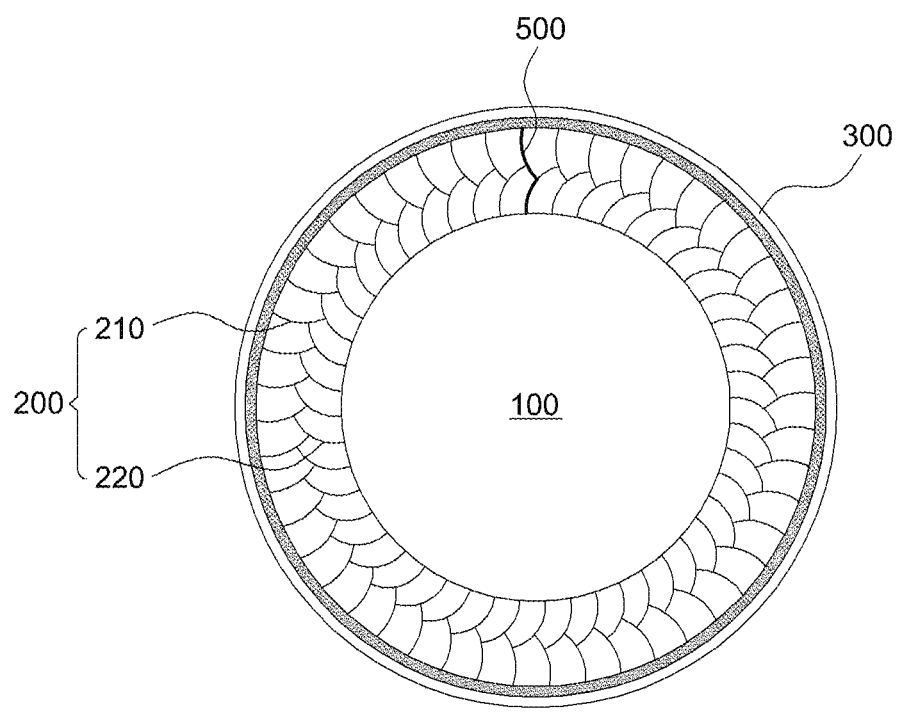
FIG. 1 is a front view of a non-pneumatic tire according to an embodiment of the present disclosure.

Hereinafter, embodiments of the present disclosure will be described with reference to the accompanying drawings. However, the disclosure can be embodied in various different forms, and the scope of the disclosure should not be construed as being limited to the embodiments described herein. In the drawings, in order to describe clearly the invention, parts not related to the description are omitted, and like reference signs will be given to like constitutional element throughout the specification.

As used herein, "connecting (or combining)" a part with another part (or "bring" a part into contact or touch with another part) may refer to a case where they are "indirectly connected" to each other with other element intervening therebetween, as well as a case where they are "directly connected". Further, when a part "includes (or comprises)" a component, it does not mean that the part excludes other component, but means that the part may further include other component unless expressly stated to the contrary.

The terms used herein are used to merely describe specific embodiments, and are not intended to limit the disclosure. The singular forms may include the plural forms unless the context clearly indicates otherwise. The terms such as "include (or comprise)", "have (or be provided with)", and the like are intended to indicate that features, numbers, steps, operations, components, parts, or combinations thereof written in the following description are present, and thus should not be understood as that the possibility of existence or addition of one or more different features, numbers, steps, operations, components, parts, or combinations thereof is excluded in advance.

Hereinafter, the disclosure will be described in detail with reference to the accompanying drawings.

Figure 2:
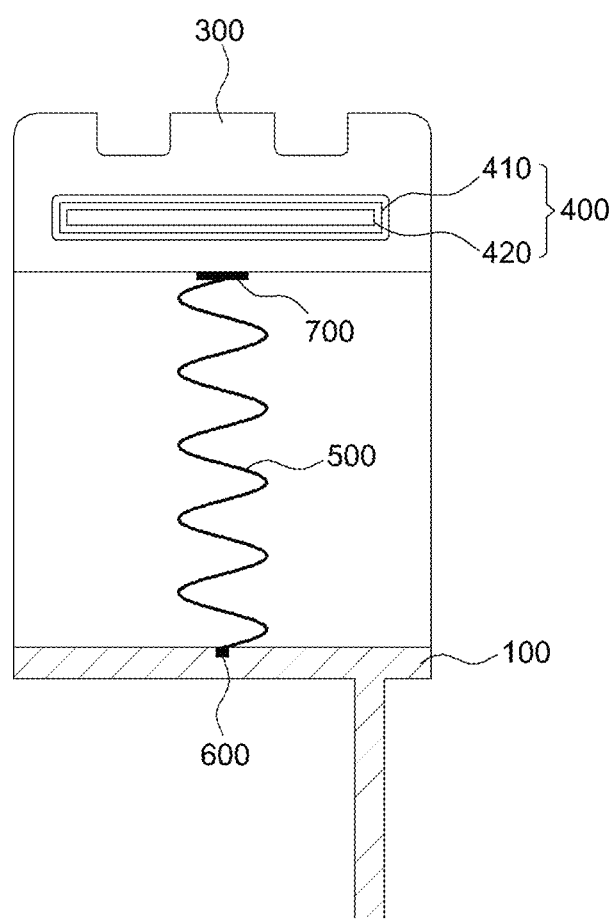
FIG. 2 is a cross-sectional view of a non-pneumatic tire according to an embodiment of the present disclosure.
Figure 3:
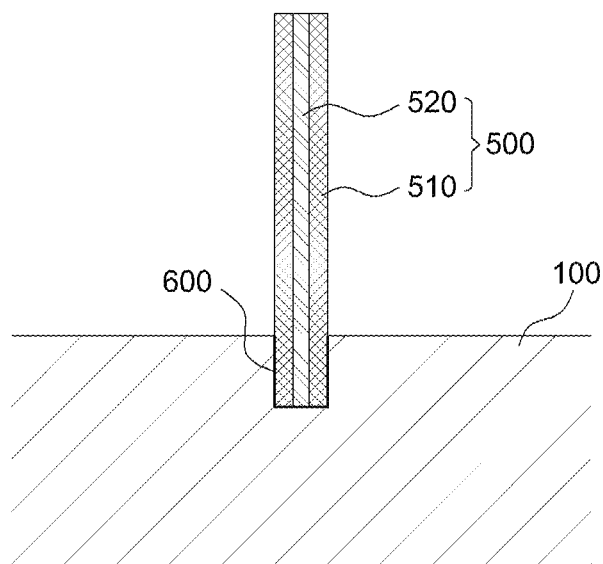
FIG. 3 is an enlarged view illustrating the coupling of a conductive structure part and a rim part according to an embodiment of the present disclosure.
Figure 4:
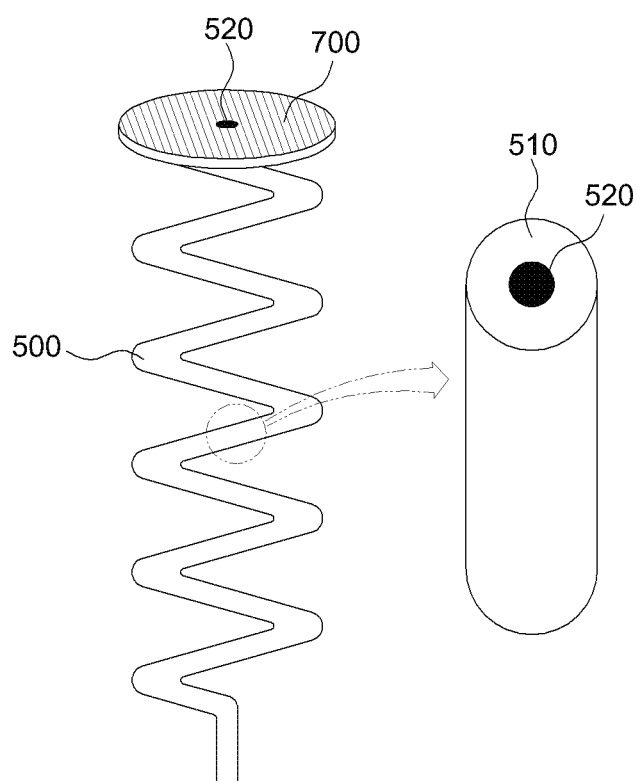
FIG. 4 is an enlarged view (left) and cross-sectional perspective view (right) of a conductive structure part according to an embodiment of the present disclosure.

FIG. 1 is a front view illustrating a whole of a tire according to an embodiment of the present disclosure, FIG. 2 is a cross-sectional view of a tire according to an embodiment of the present disclosure, FIG. 3 is an enlarged view illustrating a junction part of a conductive structure part 500 and a rim part 100 according to an embodiment of the present disclosure, and FIG. 4 is an enlarged view and cross-sectional perspective view of the conductive structure part 500 according to an embodiment of the present disclosure.

As shown in FIGS. 1 to 4, a non-pneumatic tire according to an embodiment of the present disclosure may include a rim part 100 in which an insertion part 600 is formed and being connected with an axle, a tread part 300 formed in a shape of surrounding an outer side of the tire in a circumferential direction thereof and being in contact with the ground, a spoke part 200 formed between the rim part 100 and the tread part 300 and provided with upper arch bodies 210 and lower arch bodies 220 of an arch shape to absorb impacts transmitted from the ground to the tread part 300, a structural reinforcement part 400 inserted into the inside of the tread part 300 to perform load support and stress distribution of the spoke part 200, and a conductive structure part 500 formed between an outer surface of the rim part 100 and an inner surface of the tread part 300, to discharge static electricity from the axle to the ground.

The rim part 100 may be formed in a cylindrical shape, be coupled to an axle, be provided with the insertion part 600 coupled with the conductive structure part 500, and receive a driving force through the axle.

The tread part 300 may be formed to surround the outer surface of the spoke part 200 along the circumferential direction. The tread part 300 may alleviate impacts transmitted from the ground when coming in contact with the ground.

The spoke part 200 may be provided with the upper arch bodies 210 and lower arch bodies 220 of an arch shape. The upper arch bodies 210 is connected to the inner surface of the tread part 300, and the lower arch bodies 220 is connected to the outer surface of the rim part 100. In addition, the upper arch bodies 210 and the lower arch bodies 220 are alternately connected with the corresponding upper arch bodies 210 and lower arch bodies 220 so that the upper and lower arch bodies connect the tread part 300 with the spoke part 200. The spoke part 200 may be formed of one material selected from an elastomer and a rubber material, and the spoke part 200 can absorb impacts transmitted from the ground to the tread part 300.

The conductive structure part 500 may be provided with a covering body 510 coating around a conductive fiber body 520. The conductive structure part 500 may have a diameter of 1 to 5 millimeters (mm) and also have a zigzag shape. The zigzag shape of the conductive structure part 500 coupled from the outer surface of the rim part 100 to the inner surface of the tread part 300 may contribute to the prevention of detachment of the conductive structure part 500 from the outer surface of the rim part 100 or the inner surface of the tread part 300 when the spoke part 200 is deformed due to the load transmitted from the ground during driving. Further, it may facilitate the replacement of the damaged conductive structure part. Furthermore, it may minimize the stress of the conductive structure part 500 generated by the compressive tension when a motor vehicle is driving. In addition, at the upper end of the conductive structure part 500, a disk-shaped adhesion part 700 may be formed to facilitate the coupling of the conductive structure part with the inner surface of the tread part 300, and the adhesion part 700 may be coupled to the inner surface of the tread part via an adhesive. The lower end of the conductive structure part 500 may be formed in a cylindrical shape in order to facilitate the coupling of the conductive structure part with the insertion part 600 formed in the outer surface of the rim part 100.

The conductive structure part 500 may be formed between the outer surface of the rim part 100 and the inner surface of the tread part 300, the lower end of the conductive structure part 500 may be inserted into the insertion part 600 and combined with the rim part 100, and the upper end of the conductive structure part 500 may be coupled to the inner surface of the tread part 300. As another example, the conductive structure 500 may be formed such that it is coupled along the surface of the lower arch body 220 and upper arch body 210 and also coupled to the outer surface of the rim part 100 and the inner surface of the tread part 300.

The conductive fiber body 520 may be formed with fibers of 10's to 100's obtained by electroplating any one material selected from general petroleum-based synthetic fibers and cellulose-based fibers using a metal salt. If the conductive fiber body 520 is less than 10's, the bonding force thereof with the covering body 510 decreases, and thus there may occur a problem that the covering body 510 is easily peeled from the conductive fiber body. In addition, if the conductive fiber body 520 exceeds 100's, there may occur a problem that discharge performance is deteriorated.

In the non-pneumatic tire of the present disclosure, by adjusting the diameter of the conductive fiber body 520, the discharge capacity of the conductive structure part 500 can be adjusted. Since resistance decreases as the diameter of the conductive fiber body 520 increases, the discharge performance of the conductive structure part 500 may increase as the diameter of the conductive fiber body 520 increases.

The conductive fiber body 520 may be blended with cotton to increase the bonding force thereof with the covering body 510. In this regard, the conductive structure part may include cotton mixed with the conductive fiber body 520, and the conductive fiber body 520 may be included by 20 to 80 parts by weight while the cotton may be included by 80 to 20 parts by weight. If the blend rate of the conductive fiber body 520 is less than 20 parts by weight, the discharge performance may be deteriorated. In addition, if the blend rate of the conductive fiber body 520 is greater than 80 parts by weight, the bonding force between the conductive fiber body 520 and the covering body 510 is lowered, such that peeling may occur.

In the non-pneumatic tire of the present disclosure, by varying the material of the metal salt of the conductive fiber body 520, the discharge capacity of the conductive structure part 500 can be adjusted. The discharge performance of the conductive structure part 500 may be better as the electrical conductivity of the metal salt is becomes higher.

In the non-pneumatic tire of the present disclosure, by adjusting the blend rate between the yarn plated using a metal salt and cotton of the conductive fiber body 520, the discharge capacity of the conductive structure part 500 can be adjusted. As the blend rate of the yarn plated using a metal salt increases, the ratio of the conductor contained in the conductive fiber body 520 increases. Accordingly, since the amount of electric current increases, the discharge performance increases. Therefore, as the blend rate of the yarn plated using a metal salt increases, the discharge performance of the conductive structure part 500 may increase.

FIG. 5 is a table regarding a discharge performance test depending on whether the conductive structure part 500 is coupled in the non-pneumatic tire and the material of the conductive fiber body 520.

COMPARATIVE EXAMPLE 1

The test was performed with a non-pneumatic tire without the conductive structure part 500.

EXAMPLE 1

The conductive fiber body 520 was formed with fibers of 20's obtained by blending cotton to copper sulfate-plated PU fibers in a ratio of 2:8 on the basis of weight.

EXAMPLE 2

The conductive fiber body 520 was formed with fibers of 20's obtained by blending cotton to copper sulfate-plated PU fibers in a ratio of 4:6 on the basis of weight.

EXAMPLE 3

The conductive fiber body was formed with fibers of 30's obtained by blending cotton to silver-plated PU fibers in a ratio of 6:4 on the basis of weight.

As shown in FIG. 5, in the high speed durability experiment, it can be seen that no mechanical damage occurred for 100 minutes in all [Comparative Example 1], [Example 1], [Example 2] and [Example 3]. In addition, in the discharge performance experiment, values of 1000 megaohms (MΩ), 200 MΩ, 80 MΩ and 20 MΩ are measured in [Comparative Example 1], [Example 1], [Example 2] and [Example 3], respectively. Since the amount of electric current flowing therethrough is greater as the measured resistance value is smaller, it can be seen that the better the discharge performance is better as the measured resistance value is smaller. Accordingly, it can be understood that the discharge performance is excellent in the order of [Example 3], [Example 2], [Example 1], and then [Comparative Example 1].

With the above-mentioned configuration, the present disclosure enables static electricity generated at an axle during driving or stopping of a motor vehicle to be discharged by combining the conductive structure part including the fiber plated using a metal salt with a non-pneumatic tire.

The effects of the present disclosure are not limited to the aforementioned effects, but should be understood as including all effects that can be inferred from the configuration provided by the detailed description or claims of the present application.

The aforementioned description of the present disclosure is merely an example, and a person having ordinary skill in the art to which the present disclosure pertains may understand that it can be easily modified into other specific configuration without changing the technical idea or essential features of the present disclosure. Thus, the embodiments described above should be construed not as limiting but as exemplary in every aspect. For example, the respective components described as a singular form may be implemented in a distributed form, and the respective components described in a distributed form may be implemented in a combined form.

The scope of the present disclosure is represented by the following claims, and all modifications and changes derived from the meaning and scope of the claims and equivalents thereof should be interpreted as being included in the scope of the present disclosure.

What is claimed is:

1. A non-pneumatic tire including a fiber plated using a metal salt, the non-pneumatic tire comprising:
   a rim part configured to be connected to an axle;

a tread part disposed in a shape of surrounding an outer side of the non-pneumatic tire in a circumferential direction thereof and configured to be in contact with a ground;

a spoke part disposed between the rim part and the tread part and provided with a plurality of upper arch bodies and a plurality of lower arch bodies, each of the plurality of upper arch bodies and each of the plurality of lower arch bodies having an arch shape configured to absorb impacts transmitted from the ground to the tread part;

a structural reinforcement part configured to be inserted into an inside of the tread part to perform load support and stress distribution of the spoke part;

a conductive structure part disposed between an outer surface of the rim part and an inner surface of the tread part and configured to discharge static electricity from the axle to the ground; and a disk-shaped adhesion part configured to couple the conductive structure part to the tread part, wherein the conductive structure part includes a conductive fiber body configured to discharge static electricity generated at the axle to the ground, wherein the conductive fiber body is electroplated with the metal salt, and wherein the conductive structure part is disposed in a zigzag shape from the outer surface of the rim part to the inner surface of the tread part.

2. The non-pneumatic tire of claim 1, wherein the spoke part includes elastomer or rubber.

3. The non-pneumatic tire of claim 1, wherein the rim part has an insertion part to which the conductive structure part is coupled.

4. The non-pneumatic tire of claim 1, wherein the conductive structure part further includes a covering body coated on the conductive fiber body.

5. The non-pneumatic tire of claim 4, wherein the conductive fiber body is blended with cotton to increase bonding force thereof with the covering body.

6. The non-pneumatic tire of claim 5, wherein the conductive fiber body is included by 20 to 80 parts by weight and the cotton is included by 80 to 20 parts by weight.

7. The non-pneumatic tire of claim 1, wherein the conductive fiber body includes synthetic fibers or cellulose-based fibers electroplated with the metal salt.

8. The non-pneumatic tire of claim 1, wherein an upper end of the conductive structure part coupled to the inner surface of the tread part is disposed in a disk shape.

9. The non-pneumatic tire of claim 1, wherein the conductive structure part is coupled along an outer surface of a lower arch body of the plurality of lower arch bodies and an upper arch body of the plurality of upper arch bodies.

10. The non-pneumatic tire of claim 1, wherein a resistance value of the conductive structure part is in a range of 20 MΩ to 200 MΩ.

11. The non-pneumatic tire of claim 1, wherein the conductive fiber body is defined by fibers having thickness of 10's to 100's.

* * * * *